Figure 1:
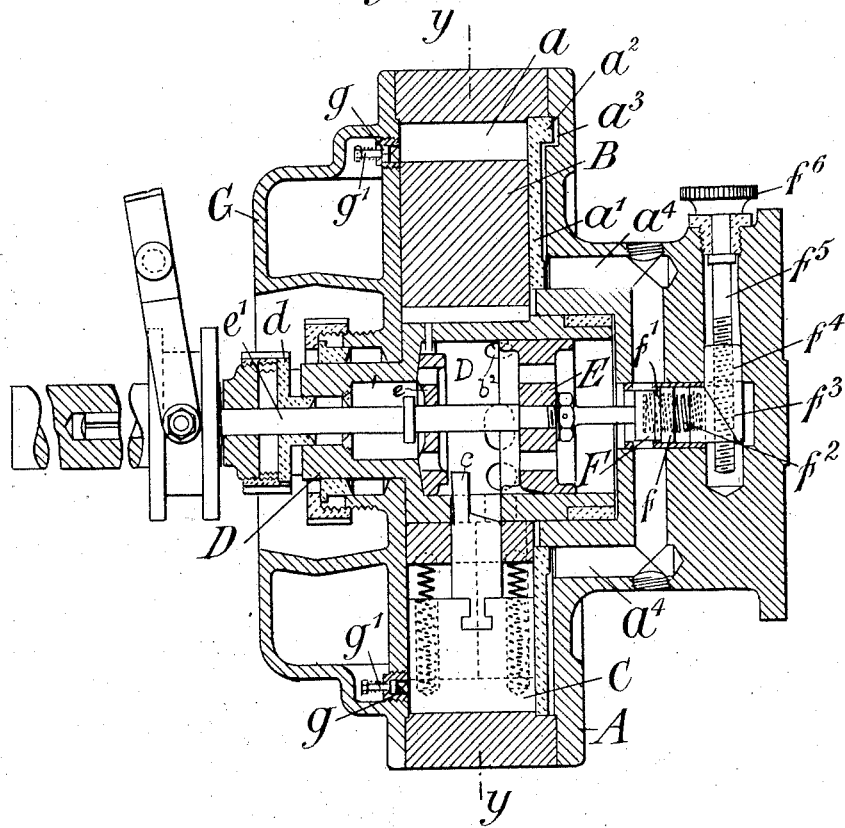

No. 873,978.  
PATENTED DEC. 17, 1907.

F. BAILEY & F. H. JACKSON.

CLUTCHING DEVICE ADAPTED FOR USE IN COMMUNICATING ROTARY MOTION AND IN CONTROLLING THE TRANSMISSION THEREOF.

APPLICATION FILED DEC. 27, 1906.

2 SHEETS—SHEET 1.

Witnesses:
C. J. Ashdown.
W. J. Cain.

Inventors:
Frank Bailey
Frederick Henry Jackson
per G. H. M. Hardingham
Attorney.

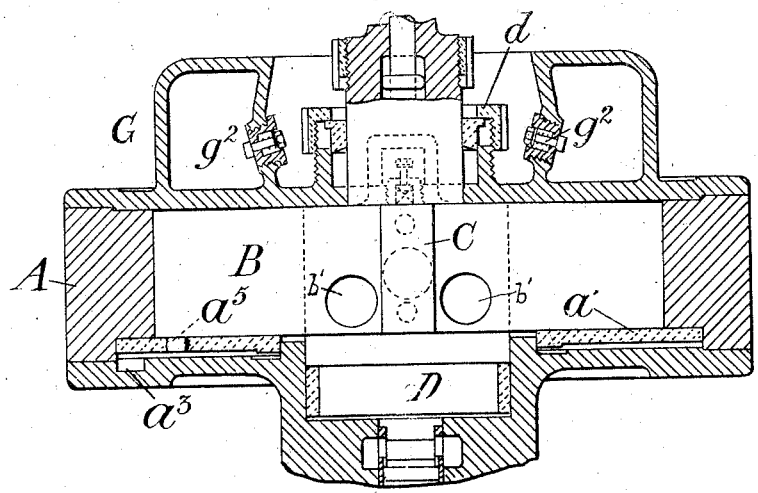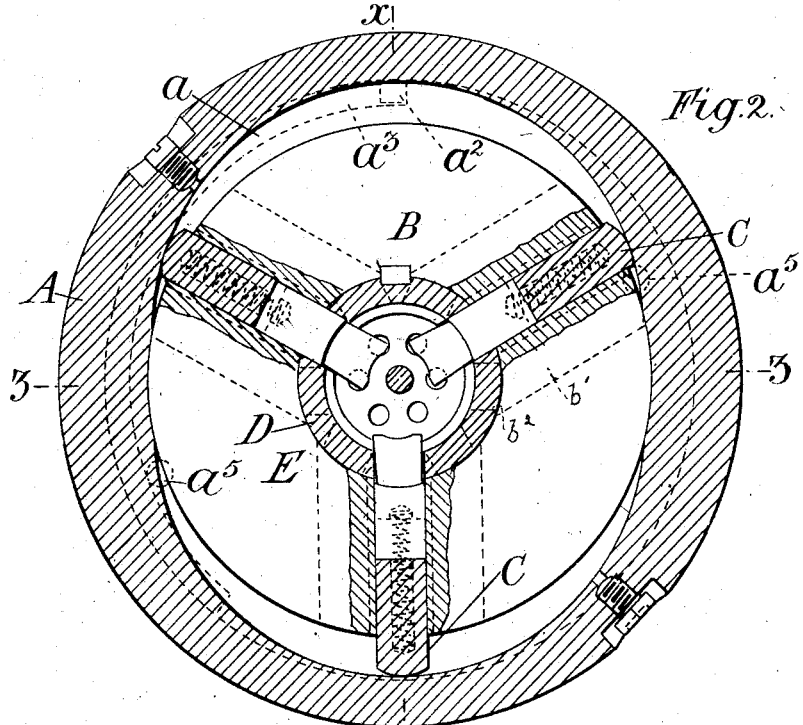

UNITED STATES PATENT OFFICE.

FRANK BAILEY AND FREDERICK HENRY JACKSON, OF LONDON, ENGLAND.

CLUTCHING DEVICE ADAPTED FOR USE IN COMMUNICATING ROTARY MOTION AND IN CONTROLLING THE TRANSMISSION THEREOF.

No. 873,978.      Specification of Letters Patent.    Patented Dec. 17, 1907.

Application filed December 27, 1906. Serial No. 349,686.

*To all whom it may concern:*

Be it known that we, FRANK BAILEY and FREDERICK HENRY JACKSON, subjects of the King of Great Britain and Ireland, and residing at 64 Bankside, in the county of London, England, have invented new and useful Improvements in Clutching Devices Adapted for Use in Communicating Rotary Motion and in Controlling the Transmission Thereof, of which the following is a specification.

This invention relates to the transmission of rotary motion by means of apparatus of the kind described in the specification filed in pursuance of our application for Letters Patent on the 30th November, 1906, Ser. No. 345,794, and consists in certain improvements designed to increase the efficiency of such apparatus.

In the accompanying drawings, which illustrate clutch apparatus constructed according to our improved method, Figure 1 is a longitudinal section on the line $x$—$x$ in Fig. 2, Fig. 2 is a transverse section on the line $y$—$y$ in Fig. 1 and Fig. 3 is a partial longitudinal section on the line $z$—$z$ in Fig. 2.

In our aforesaid prior specification is described a clutching device adapted in any position of "slip-drive," to operate as a hydraulic clutch and, upon the return-flow-passages being closed and conditions established for "full-drive," to operate as a positive or mechanical clutch. The said clutching device comprises a casing A formed with a chamber $a$ which incloses a closely fitting circular disk B; the said chamber having one or more enlargements of a circular but eccentric character. The disk B is formed with radial slots in which slab-like pistons C slide; the sides of the said pistons closely fitting the inner sides of the casing. When the disk B revolves in relation to the casing A, or the casing revolves about the disk, as the case may be, the pistons C, if uncontrolled in the manner hereinafter described, sweep the eccentric or other enlargement or enlargements of the central chamber $a$.

The disk B is mounted upon a hollow shaft D, and is provided with radial passages $b'$, whereby communication is established between the peripheral exterior of the disk and the interior of the hollow shaft; such communication being, however, under the control of a piston-valve E, with which the interior of the shaft is fitted.

The inner sides of the slab-like pistons C are formed with stems $c$ which project radially inwards, towards the axis of the disk B, and protrude into the interior of the hollow shaft D. Opposite the piston-valve E is a disk $e$, adapted to press against, and frictionally to engage, the sides of the said stems $c$ when the valve is fully open, with the effect that the pistons C are, under such conditions, held out of operation.

The stems before referred to and the piston-valve E are, moreover, formed in such a manner in relation to one another that, cutting off the ports $b^2$ of the radial passages $b'$, the piston-valve E may be further advanced so as to intercept the inward movement of the piston-stems $c$ and thus, by holding the pistons C in their protruded positions, to prevent the disk B, in which they are mounted, being rotated within the circular chamber.

According to the present improvements, instead of the opposite sides of the circular disk B working in contact with the sides of the casing A, there is interposed, between one of its sides and the casing, a circular plate $a'$, to the back of which the fluid under pressure is admitted, with the effect that the plate is pressed into contact with the side of the disk B, the opposite side of the latter being in turn pressed against the casing A; leakage being thereby prevented or diminished. A similar packing-plate may, in like manner, be applied on the opposite side of the disk. The packing-plate $a'$ is free to move slightly towards or away from the disk B; but it is prevented from rotating with the disk by reason of a stop $a^2$ which engages in a recess $a^3$ and compels the plate $a'$ to revolve with the casing A. Passages $a^4$ $a^4$ lead from the back of the plate, and preferably converge at a central point, where they are controlled by a spring-mounted piston F or other suitable valve. The piston of this valve may be controlled from the exterior by means of the spindle $e'$ so as to open or close communication between the passages $a^4$ $a^4$ and the interior of the hollow shaft D. When communication between the passages and the shaft is open, the pressure of the plate $a'$ on the disk B is relieved, and leakage of the liquid is permitted; the liquid being also free to escape by way of holes $a^5$ $a^5$ in the packing-plate. The relief afforded by the opening of the supplementary valve F is of considerable importance when the disk B is running freely in the casing A. Not only are additional passages rendered available for the return of the fluid, but considerable clearance is left between the disk B and pistons C on the one hand and the walls of the casing A on the other hand, copious leakage resulting with corresponding reduction in resistance to the pumping action of the apparatus.

The action of the liquid on the plate $a'$ is as follows:—Referring to Figs. 2 and 3 of the drawings and assuming the clutch to be rotating from left to right of the observer, and that the valve E is in the position shown in Fig. 1: the top portion of the chamber $a$ between the pistons will contain liquid at about atmospheric pressure, the space to the right of the vertical piston will be below atmospheric pressure and drawing in oil, while the space to the left of this piston will be filled with oil which is being forced through the hole $a^5$ in the plate $a'$ and through the passage $b'$ into the central chamber in the disk and thence to the back of the plate $a''$. Thus it will be seen that the side of the disk facing the chamber $a$ is not yet subjected to pressure over its whole surface but only over a comparatively small area, while the opposite side of the plate is subjected to pressure over its whole area.

If the plate $a'$ is out of contact with the disk B when the clutch is brought into operation, that face of the plate which is opposite the disk is subjected to areas or zones of greater or less pressure due to the sweeping action of the blades C, and the liquid at the greater pressure is conducted by way of the holes $a^5$ $a^5$ to the chamber at the back of the plate. The supplementary valve F being partially or wholly closed there is little or no escape of the liquid, consequently, the greater pressure to which portions of the face of the plate is subjected is transmitted to the whole surface at the back of the plate, thereby forcing the plate into contact with the disk.

When the packing-plate $a'$ and appurtenances here referred to are employed in conjunction with means for maintaining the sliding pistons C either in their protruded or in their retracted positions, the valve F, which controls communication with the back of the packing-plate $a'$, may be operated by the spindle of the valve E controlling the positions of the slab-like pistons C.

Where the apparatus is required to be capable of transmitting motion in the reverse direction also, or for occasional use as a brake, the stop $a^2$ carried by the plate $a'$ is arranged to work in a chase $a^3$ formed in the casing A; the chase being of such length as to permit of the plate $a'$ partaking of an angular movement in relation to the casing, the extent of this angular movement being such as to adapt the positions of the holes $a^5$ $a^5$, before referred to, to the reversed direction of running or of power transmission.

Where the apparatus is not required for transmitting motion in the reverse direction or for use as a brake the extension of the recess for the reception of the stop $a^2$ so as to form a chase, and to permit of angular movement between the plate $a'$ and the casing A is superfluous, but if made has no injurious effect.

It will be obvious that the stop $a^2$ might be mounted in the casing and engage in a recess formed in the edge of the plate $a'$.

A further improvement consists in the provision of means whereby the chamber $a$ containing the liquid, is automatically replenished by the pumping action of the clutch. With this object, we arrange, in convenient relation to the liquid-chamber $a$, a reservoir G containing the liquid for the replenishment of the clutch-chamber. This reservoir is placed in communication, by way of pipes or passages $g$, with that portion of the pump-chamber $a$, which, during the pumping action of the clutch, is under the influence of suction. The pipes or passages communicating with that portion of the liquid-chamber are furnished with non-return valves $g'$, so arranged as to admit the liquid to the chamber, but to prevent its return therefrom when the apparatus is at rest. The reservoir may be arranged as a shield upon the side of the clutch-casing, as shown in Figs. 1 and 3, and in such a position as to catch any oil which may leak from the main-shaft-stuffing-box $d$; the oil passing into the reservoir G by way of non-return valves $g^2$.

When it is desired that, upon a certain torque being reached, the clutch shall permit "slip" to take place, the pressure-side of the liquid chamber $a$, or a chamber or passage communicating therewith, is provided with a relief-valve, which may be adjustable. This valve may be of the ordinary relief-valve type, but we prefer to construct the valve F, which controls the passages $a^4$ from the back of the packing-plate $a'$, in such a manner as to operate automatically as a relief-valve. This may be accomplished by constructing it as a piston-valve having on one side a trunk $f$, thus forming an annulus $f'$ to which the pressure-fluid is admitted; the load thereon being balanced by a spring $f^2$. When the pressure on the annulus overcomes that of the spring, the valve moves so as to place the delivery-side of the pump in direct communication with the suction-side thereof. For the purpose of adjusting the load of the spring $f^2$, we provide an abutment $f^3$, against one face of which the outer end of the spring bears, while the opposite face of the abutment is inclined. This inclined face bears against a correspondingly inclined face presented by a nut $f^4$ capable of being traversed by means of a spindle $f^5$ furnished with a milled head $f^6$.

It will be obvious that the improvements hereinbefore described are equally applicable in cases where the construction of the pump differs from that adopted by us. For example, the disk might be elliptical and might revolve in a circular casing, the slab-like pistons being mounted to slide in the casing instead of in the disk.

What we claim as our invention and desire to secure by Letters Patent, is:—

1. In hydraulic clutch mechanism of the character herein referred to, the combination, with an eccentrically formed casing or chamber and a disk formed with radial slots in which slab-like pistons slide, of a packing-plate interposed between said disk and one wall of said chamber, and passages formed in said wall and leading from said plate to a controlling valve, whereby the liquid under pressure is admitted to the back of the plate, substantially as and for the purpose set forth.

2. In hydraulic clutch mechanism, the combination, with an eccentrically formed liquid-chamber, a disk inclosed within said chamber and slab-like pistons which slide in radial slots formed in said disk, of a main controlling valve, a supplementary valve operated in unison with said controlling valve, and passages communicating between the liquid chamber and said supplementary valve, which latter serves to more rapidly relieve the pressure of the liquid in the chamber and correspondingly diminish the resistance.

3. In hydraulic clutch mechanism of the character herein referred to, the combination, with a liquid-chamber, a disk inclosed within said chamber and a packing-plate interposed between one wall of the liquid chamber and the disk, of means, such as a stop upon said plate working in a chase formed in said chamber, for enabling the plate to partake of a limited rotative movement in relation to the said casing when the direction of running or of power transmission is reversed, substantially as and for the purposes set forth.

4. In hydraulic clutch mechanism of the character herein referred to, the combination, with a liquid-chamber and a disk inclosed within said chamber, of a packing-plate interposed between one wall of the liquid-chamber and the disk, a valve-chamber in said wall, passages communicating between the back of said plate and the valve-chamber, and a relief-valve within said valve-chamber, whereby, upon a certain predetermined pressure being reached, the valve opens automatically and permits the liquid under pressure to escape from the back of the packing-plate to the exhaust or suction-side of the pump.

5. In hydraulic clutch mechanism of the character herein referred to, the combination, with a liquid-chamber, of an oil-reservoir formed upon one wall of said chamber, passages communicating between said reservoir and the exhaust or suction-side of the liquid-chamber, and non-return valves in said passages, the oil or other liquid passing from the reservoir to the pump-chamber under the influence of the suction or of centrifugal force, substantially as herein described.

In testimony whereof we have signed our names to this specification in the presence of two subscribing witnesses.

FRANK BAILEY.
FREDERICK HENRY JACKSON.

Witnesses:
H. D. JAMESON,
A. NUTTING.